US012731381B2

(12) United States Patent
Cui et al.

(10) Patent No.: US 12,731,381 B2
(45) Date of Patent: Sep. 8, 2026

(54) IMAGE ENCODING LEARNING AND APPLICATION

(71) Applicant: BEIJING YOUZHUJU NETWORK TECHNOLOGY CO., LTD., Beijing (CN)

(72) Inventors: Quan Cui, Beijing (CN); Hao Wu, Beijing (CN); Cheng Yang, Beijing (CN)

(73) Assignee: BEIJING YOUZHUJU NETWORK TECHNOLOGY CO., LTD., Beijing (CN)

( * ) Notice: Subject to any disclaimer, the term of this patent is extended or adjusted under 35 U.S.C. 154(b) by 223 days.

(21) Appl. No.: 18/398,945

(22) Filed: Dec. 28, 2023

(65) Prior Publication Data

US 2024/0185578 A1 Jun. 6, 2024

(30) Foreign Application Priority Data

Jan. 10, 2023 (CN) ......................... 202310032610.9

(51) Int. Cl.
*G06V 10/82* (2022.01)
*G06V 10/50* (2022.01)
(Continued)

(52) U.S. Cl.
CPC ............ *G06V 10/774* (2022.01); *G06V 10/50* (2022.01); *G06V 10/82* (2022.01); *G06V 10/98* (2022.01); *G06V 20/70* (2022.01)

(58) Field of Classification Search
CPC ...... G06V 10/82; G06V 10/774; G06V 20/50; G06V 20/70
See application file for complete search history.

(56) References Cited

U.S. PATENT DOCUMENTS 11,714,849 B2 * 8/2023 Zhou .................. G06V 10/7788 382/100
12,333,837 B2 * 6/2025 He ........................ G06F 16/583
(Continued)

FOREIGN PATENT DOCUMENTS

CN 108959322 A 12/2018
CN 108228686 B 3/2021
(Continued)

OTHER PUBLICATIONS

Office Action for Chinese Patent Application No. 202310032610.9, mailed on Dec. 23, 2025, 17 pages.
(Continued)

*Primary Examiner* — Shaghayegh Azima
(74) *Attorney, Agent, or Firm* — Astute IP Law Group

(57) ABSTRACT

Embodiments of the present disclosure provide a solution for image encoding learning and application. A method for image encoding learning comprises: extracting an image feature representation of a sample image using an image encoder to be trained; extracting a text feature representation of a sample text sequence using a text encoder, the sample text sequency being associated with the sample image; generating, using the text encoder, a predicted text sequence based on the text feature representation and the image feature representation; and training the image encoder at least based on a text error between the predicted text sequence and the sample text sequence.

20 Claims, 7 Drawing Sheets

(51) Int. Cl.

| | |
|---|---|
| ***G06V 10/774*** | (2022.01) |
| ***G06V 10/98*** | (2022.01) |
| ***G06V 20/70*** | (2022.01) |

(56) References Cited

U.S. PATENT DOCUMENTS

| | | | | |
|---|---|---|---|---|
| 12,424,010 | B2 * | 9/2025 | Lv | G06V 10/44 |
| 2020/0117854 | A1 * | 4/2020 | Lu | G06V 10/82 |
| 2021/0203997 | A1 * | 7/2021 | Veselov | G06V 10/454 |
| 2021/0248309 | A1 * | 8/2021 | Zhang | G06N 20/00 |
| 2021/0358177 | A1 * | 11/2021 | Park | G06T 9/002 |
| 2022/0172080 | A1 * | 6/2022 | Chaudhury | G06N 3/0895 |
| 2022/0284321 | A1 * | 9/2022 | Yuan | G06N 5/04 |
| 2022/0415071 | A1 | 12/2022 | Zhang et al. | |
| 2023/0019211 | A1 * | 1/2023 | Wang | G06T 7/0012 |
| 2023/0162490 | A1 * | 5/2023 | Zhang | G06F 40/166 382/159 |
| 2023/0178076 | A1 * | 6/2023 | Abramson | G10L 15/16 704/232 |
| 2023/0245418 | A1 * | 8/2023 | Zhang | G06F 16/954 382/156 |
| 2024/0212327 | A1 * | 6/2024 | Geng | G06V 10/774 |

FOREIGN PATENT DOCUMENTS

| | | | | | |
|---|---|---|---|---|---|
| CN | 112560652 | A | | 3/2021 | |
| CN | 113591902 | A | | 11/2021 | |
| CN | 113792112 | A | | 12/2021 | |
| CN | 113836333 | A | | 12/2021 | |
| CN | 114494011 | A | | 5/2022 | |
| CN | 114626392 | A | | 6/2022 | |
| CN | 115062782 | A | | 9/2022 | |
| CN | 116503636 | A | * | 7/2023 | G06V 10/764 |
| CN | 114998673 | B | * | 10/2023 | G06V 10/774 |
| WO | 2022155994 | A1 | | 7/2022 | |

OTHER PUBLICATIONS

Office Action for Chinese Patent Application No. 202310032610.9, mailed on Jun. 16, 2026, 21 pages.

* cited by examiner

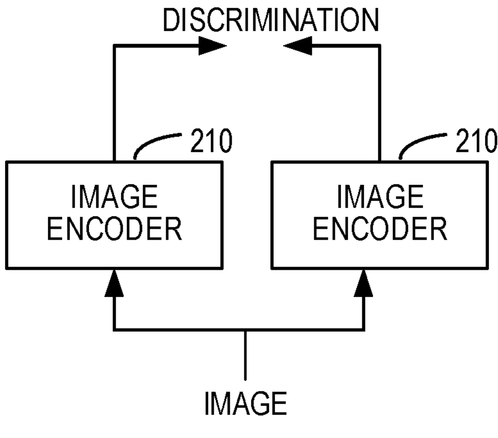
*FIG. 2A*
220
222
IMAGE ENCODER
IMAGE ENCODER
IMAGE
GENERATE D IMAGE
*FIG. 2B*
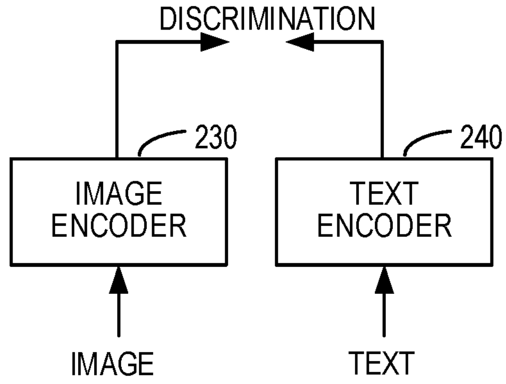
*FIG. 2C*

IMAGE ENCODING LEARNING AND APPLICATION

CROSS-REFERENCE

The present application claims priority to Chinese Patent Application No. 202310032610.9, filed on Jan. 10, 2023 and entitled "METHODS, APPARATUSES, DEVICE AND MEDIUM FOR IMAGE ENCODING LEARNING AND APPLICATION", the entirety of which is incorporated herein by reference.

FIELD

The example embodiments of the present disclosure relate generally to the field of computers, and more particularly to methods, apparatuses, devices, and computer-readable storage medium for image encoding learning and application.

BACKGROUND

With the development of machine learning technology, machine learning models can be used to perform tasks in various scenarios. Model-based vision tasks are used to process visual data, such as images, videos, etc. Examples of vision tasks include, but are not limited to, image classification, object detection, semantic segmentation, and the like. In the models for vision tasks, the challenge lies in how to extract features that can accurately represent image data. A model used to extract feature representations of images is usually called an image encoder.

SUMMARY

In a first aspect of the present disclosure, there is provided a method for data encoding learning. The method comprises: extracting an image feature representation of a sample image using an image encoder to be trained; extracting a text feature representation of a sample text sequence using a text encoder, the sample text sequency being associated with the sample image; generating, using the text encoder, a predicted text sequence based on the text feature representation and the image feature representation; and training the image encoder at least based on a text error between the predicted text sequence and the sample text sequence.

In a second aspect of the present disclosure, there is provided a method for image encoding application. The method comprises: obtaining an image encoder trained according to the method in the first aspect; extracting, using the obtained image encoder, an image feature representation of a target image; and performing a predetermined vision task for the target image based on the image feature representation.

In a third aspect of the present disclosure, there is provided an apparatus for image encoding learning. The apparatus comprises: an image feature extracting module configured to extract an image feature representation of a sample image using an image encoder to be trained; a text feature extracting module configured to extract a text feature representation of a sample text sequence using a text encoder, the sample text sequency being associated with the sample image; a text generating module configured to generate, using the text encoder, a predicted text sequence based on the text feature representation and the image feature representation; and a training module configured to train the image encoder at least based on a text error between the predicted text sequence and the sample text sequence.

In a fourth aspect of the present disclosure, there is provided an apparatus for image encoding application. The apparatus comprises: an obtaining module configured to obtain an image encoder trained according to the method of the first aspect; a feature extracting module configured to extract, using the obtained image encoder, an image feature representation of a target image; and a task performing module configured to perform a predetermined vision task for the target image based on the image feature representation.

In a fifth aspect of the present disclosure, there is provided an electronic device. The device comprises at least one processing unit; and at least one memory coupled to the at least one processing unit and storing instructions executable by the at least one processing unit. The instructions, upon execution by the at least one processing unit, cause the device to perform the method of the first aspect, and/or the method of the second aspect.

In a sixth aspect of the present disclosure, a non-transitory computer-readable storage medium is provided. The medium stores a computer program, which, when executed by a processor, cause a device to perform the method of the first aspect, and/or the method of the second aspect to be implemented.

It would be appreciated that the content described in the Summary section of the present invention is neither intended to identify key or essential features of the embodiments of the present disclosure, nor is it intended to limit the scope of the present disclosure. Other features of the present disclosure will be readily envisaged through the following description.

BRIEF DESCRIPTION OF THE DRAWINGS

The above and other features, advantages and aspects of the embodiments of the present disclosure will become more apparent in combination with the accompanying drawings and with reference to the following detailed description. In the drawings, the same or similar reference symbols refer to the same or similar elements, where:

FIG. 2A to 2C illustrate a schematic diagram of example model training architectures;

DETAILED DESCRIPTION

Figure 1:
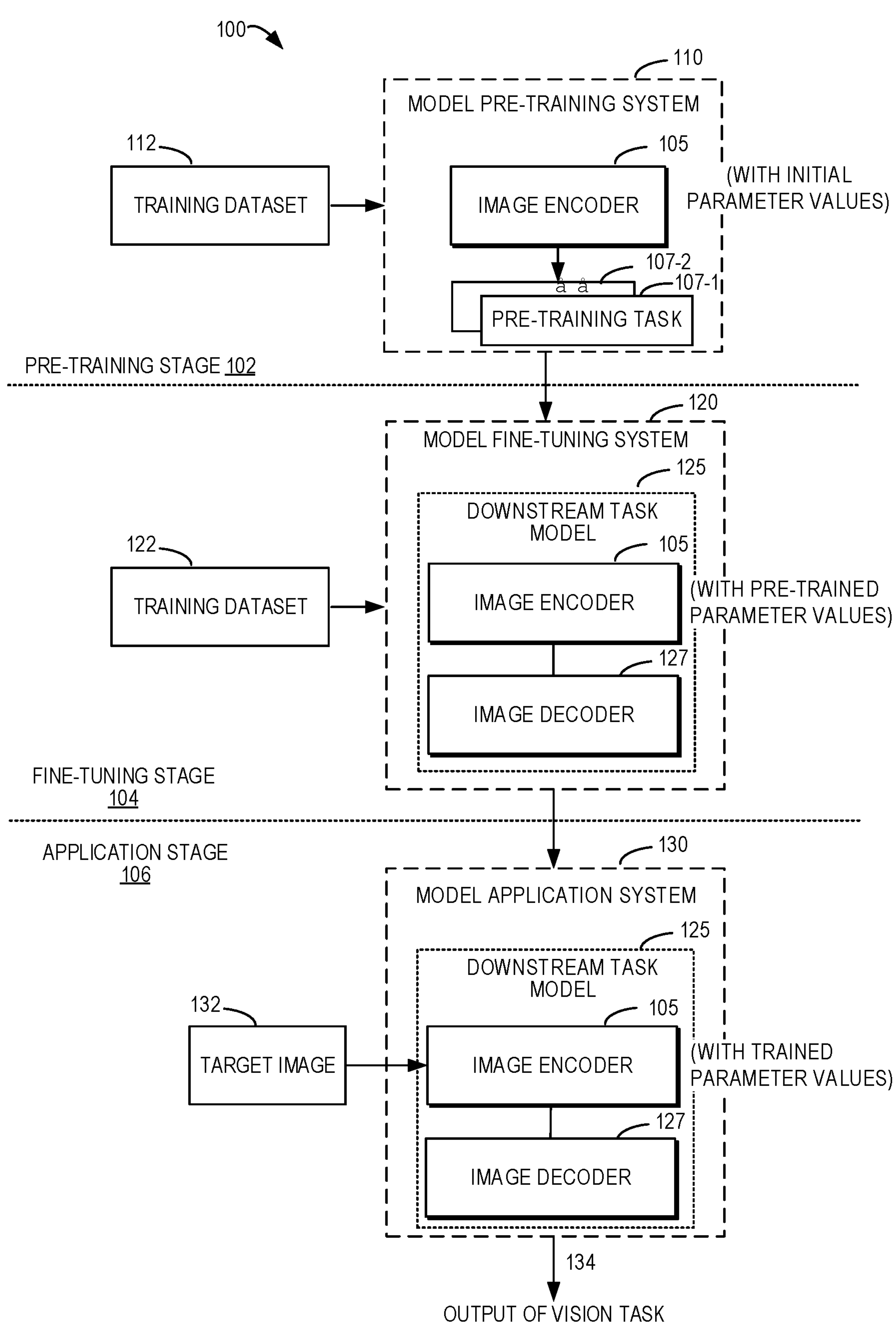
FIG. 1 illustrates a schematic diagram of an example environment in which embodiments of the present disclosure can be implemented.

The embodiments of the present disclosure will be described in more detail below with reference to the accompanying drawings. Although some embodiments of the present disclosure are shown in the drawings, it would be appreciated that the present disclosure may be implemented in various forms and should not be interpreted as limited to the embodiments described herein. On the contrary, these embodiments are provided for a more thorough and complete understanding of the present disclosure. It would be appreciated that the drawings and embodiments of the present disclosure are only for the purpose of illustration and are not intended to limit the scope of protection of the present disclosure.

In the description of the embodiments of the present disclosure, the term "including" and similar terms would be appreciated as open inclusion, that is, "including but not limited to". The term "based on" would be appreciated as "at least partially based on". The term "one embodiment" or "the embodiment" would be appreciated as "at least one embodiment". The term "some embodiments" would be appreciated as "at least some embodiments". Other explicit and implicit definitions may also be included below. As used herein, the term "model" can represent the matching degree between various data. For example, the above matching degree can be obtained based on various technical solutions currently available and/or to be developed in the future.

It will be appreciated that the data involved in this technical proposal (including but not limited to the data itself, data acquisition or use) shall comply with the requirements of corresponding laws, regulations and relevant provisions.

It will be appreciated that before using the technical solution disclosed in each embodiment of the present disclosure, users should be informed of the type, the scope of use, the use scenario, etc. of the personal information involved in the present disclosure in an appropriate manner in accordance with relevant laws and regulations, and the user's authorization should be obtained.

For example, in response to receiving an active request from a user, a prompt message is sent to the user to explicitly prompt the user that the operation requested operation by the user will need to obtain and use the user's personal information. Thus, users may select whether to provide personal information to the software or the hardware such as an electronic device, an application, a server or a storage medium that perform the operation of the technical solution of the present disclosure according to the prompt information.

As an optional but non-restrictive implementations, in response to receiving the user's active request, the method of sending prompt information to the user may be, for example, a pop-up window in which prompt information may be presented in text. In addition, pop-up windows may also contain selection controls for users to choose "agree" or "disagree" to provide personal information to electronic devices.

It will be appreciated that the above notification and acquisition of user authorization process are only schematic and do not limit the implementations of the present disclosure. Other methods that meet relevant laws and regulations may also be applied to the implementation of the present disclosure.

As used herein, the term "model" can learn a correlation between respective inputs and outputs from training data, so that a corresponding output can be generated for a given input after training is completed. The generation of the model can be based on machine learning techniques. Deep learning is a machine learning algorithm that processes inputs and provides corresponding outputs by using multiple layers of processing units. A neural networks model is an example of a deep learning-based model. As used herein, "model" may also be referred to as "machine learning model", "learning model", "machine learning network", or "learning network", and these terms are used interchangeably herein.

"Neural networks" are a type of machine learning network based on deep learning. Neural networks are capable of processing inputs and providing corresponding outputs, typically comprising input and output layers and one or more hidden layers between the input and output layers. Neural networks used in deep learning applications typically comprise many hidden layers, thereby increasing the depth of the network. The layers of neural networks are sequentially connected so that the output of the previous layer is provided as input to the latter layer, where the input layer receives the input of the neural network and the output of the output layer serves as the final output of the neural network. Each layer of a neural network comprises one or more nodes (also known as processing nodes or neurons), each of which processes input from the previous layer.

Usually, machine learning can roughly comprise three stages, namely training stage, test stage, and application stage (also known as inference stage). During the training stage, a given model can be trained using a large scale of training data, iteratively updating parameter values until the model can obtain consistent inference from the training data that meets the expected objective. Through the training, the model can be considered to learn the correlation between input and output (also known as input-to-output mapping) from the training data. The parameter values of the trained model are determined. In the test stage, test inputs are applied to the trained model to test whether the model can provide correct outputs, thereby determining the performance of the model. In the application stage, the model can be used to process actual inputs and determine corresponding outputs based on the parameter values obtained from training."

FIG. 1 illustrates a schematic diagram of an example environment 100 in which embodiments of the present disclosure can be implemented. Three different stages of the model are illustrated in the environment 100 of FIG. 1, including a pre-training stage 102, a fine-tuning stage 104, and an application stage 106. There may also be a test stage after the pre-training or fine-tuning stage is completed, which is not shown in the figure.

During the pre-training stage 102, the model pre-training system 110 is configured to perform pre-training of the image encoder 105 using a training dataset 112. At the beginning of the pre-training, the image encoder 105 may have initial parameter values. The pre-training process is to update the parameter values of the image encoder 105 to the expected values based on the training data. During the pre-training process, one or more pre-training tasks 107-1, 107-2, and the like may be designed. A pre-training task is designed to facilitate the parameter update of the image encoder 105. Some pre-training tasks may require the image encoder 105 to be connected to an image decoder associated with the pre-training tasks.

In the pre-training stage 102, the image encoder 105 can learn strong generalization capability through the large-scale training data. After the pre-training is completed, the parameter values of the image encoder 105 have been updated to be the pre-trained parameter values. The pre-trained image encoder 105 can extract the feature representation of the image in a more accurate way.

The pre-trained image encoder 105 may be provided to the fine-tuning stage 104, and is fine-tuned by the model fine-tuning system 120 for different downstream tasks. The downstream tasks may involve various vision tasks, such as image classification, object detection, semantic segmentation, and the like. In some embodiments, depending on the specific downstream task, the pre-trained image encoder 105 may be connected to an image decoder 127 required by the downstream task, thereby constructing a downstream task model 125. This is because the required outputs may be different for different downstream tasks.

In the fine-tuning stage 104, the parameter values of the image encoder 105 are further adjusted using a train dataset 122. If desired, the parameters of the image decoder 127 may also be adjusted. The image encoder 105 may perform feature representation extraction on the input image data and text data and provide it to the image decoder 127 to provide output for the corresponding task.

During the fine-tuning, the corresponding training algorithm is also applied to update and adjust the parameters of the overall model. Since the image encoder 105 has learned a lot from the training data in the pre-training stage, a small amount of training data are needed in the fine-tuning stage 204 to obtain the expected downstream task model. In some embodiments, depending on the objectives of the pre-training task, a specific image decoder may be constructed in the pre-training stage 102. In this case, if the image decoder required in the downstream task is the same as the image decoder constructed during pre-training, the pre-trained image encoder 105 and the image decoder can be directly used to form the corresponding downstream task model. In this case, the fine-tuning of the downstream task model may be skipped or only a small amount of training data is required for fine-tuning.

In the application stage 106, the obtained downstream task model 125 has trained parameter values that can be provided to the model application system 130 for use. In the application stage 106, the downstream task model 125 can be used to process real-world inputs and provide the corresponding outputs. For example, the image encoder 105 in the downstream task model 125 receives an input target image 132 to extract the corresponding feature representation. The extracted feature representation is provided to the image decoder 127 to determine a corresponding vision task output.

In FIG. 1, the model pre-train system 110, the model fine-tuning system 120, and the model application system 130 may include any computing system having computing capability, such as various computing devices/systems, terminal devices, servers, and the like. The terminal devices may include any type of mobile terminal, fixed terminal, or portable terminal, including mobile phones, desktop computers, laptop computers, notebook computers, netbook computers, tablet computers, media computers, multimedia tablets, or any combination of the foregoing, including accessories and peripherals of these devices, or any combination thereof. Servers include, but are not limited to, mainframes, edge computing nodes, computing devices in cloud environments, and the like.

It would be appreciated that the components and arrangements in the environment 100 shown in FIG. 1 are merely examples and that a computing system suitable for implementing the exemplary implementations described herein may include one or more different components, other components, and/or different arrangements. For example, although illustrated as being separated from each other, the model pre-training system 110, the model fine-tuning system 120, and the model application system 130 may be integrated in the same system or device. The implementations of the present disclosure are not limited in this respect.

In some embodiments, the training stage of the image encoder 105 may not be divided into a pre-training stage and fine-tuning stage shown in FIG. 1, but may be constructed directly based on the downstream task model and using a large number of training data to train the feature extraction model.

Visual self-supervised learning has good performance in visual representation learning. Visual self-supervised learning does not require labeling information, but uses input samples (such as images or image pairs) as supervision information to pre-train models (such as image encoders). Compared with random initialization, using the model obtained from self-supervised learning training as initialization can achieve significant benefits in many vision tasks.

However, the amount of data and supervision methods of self-supervised learning will affect the amount of information learned. In self-supervised learning, it is expected that the model obtained after the pre-training could learn a large amount of information, which is more beneficial for extracting useful information from downstream tasks. Therefore, the amount of data and supervision methods of self-supervised learning will affect the effect of pre-training transfer.

FIGS. 2A to 2C illustrate schematic diagrams of example model training architectures.

The training architecture of FIG. 2A is based on the uni-modal discriminative pre-training/training scheme. Based on this scheme, argumentation is performed on sample images, such as rotation, cropping, flipping, and the like, and the augmented image is used as a positive sample of the sample image, and other sample images in the training dataset are used as negative samples. After the positive and negative samples are constructed, discriminative learning is performed based on a contrastive loss function. The image encoder 210 is used to extract feature representations of a pair of images (the sample image and an augmented image). The objective of the discriminative learning is to discriminate whether the extracted feature representations match or not. It is expected that the extracted feature representations for positive samples are similar and matched with each other, while the extracted feature representations for negative samples are dissimilar and mismatched. However, this pre-training scheme only uses image data and cannot utilize massive graphic and text data. In addition, the pre-training architecture is based on discriminative contrastive learning, and the information learned by the image encoder is relatively limited, which is not friendly for downstream fine-tuning tasks.

The training architecture of FIG. 2B is based on the uni-modal generative pre-training/training scheme. This scheme extracts feature representations from the input by an image encoder 220, and generates images based on the extracted feature representations by an image decoder 222. The only training data required in this process is the sample images. For example, the sample images can be partially masked and input to the image encoder 220 for feature extraction, and the image decoder 222 is required to decode the original sample images from the extracted feature representation. Although this training scheme is beneficial for learning information, the amount of information learned is limited due to the fact that only image data is used during training.

The training architecture in FIG. 2C is based on the multi-modal machine learning discriminative pre-training/training scheme. The training architecture is similar to the training architecture in FIG. 2A, but instead of using uni-modal data to construct positive samples, it uses pre-obtained matching pairs of sample images and text as positive samples, and uses other sample images or text in the training dataset as negative samples. After the positive and negative samples are constructed, discriminative learning is performed based on the contrastive loss function. For a pair of sample images and text, an image encoder 230 extracts an image feature representation of the sample image, while a text encoder 240 extracts a text feature representation of the sample text. The objective of the discriminative learning is to discriminate whether the extracted feature image representation and text feature representation match or not. It is expected that the extracted image and text feature representation for the positive sample pair are similar and matched with each other, while for the negative sample pair, the extracted image and text feature representations are dissimilar and mismatched. Although the training architecture in FIG. 2C uses image and text data, this scheme is based on contrastive learning, and the amount of information the model learns from image and text data is relatively limited, which is not friendly for downstream fine-tuning tasks.

As mentioned earlier, the amount of information that can be learned during model training is related to the amount of training data and the supervision scheme used in training. Some discriminative training architectures cannot learn sufficient visual information from training data, while the uni-modal generative training architecture shown in FIG. 2B can only learn from uni-modal training data.

According to the example embodiments of the present disclosure, an improved solution for image encoding learning is provided. This solution utilizes multi-modal machine learning training data (image modal and text modal data) and performs training for an image encoder based on generative self-supervised learning. The training data includes associated (or matched) sample images and sample text. In the training of the image encoder, an image feature representation extracted by the image encoder from a sample image is used to guide the text encoder to perform a text generation task. The loss of the text generation task is used to train the image encoder. This training method can utilize the multi-modal data to enable the image encoder to learn useful feature information from the image and text data. The feature extraction capability of the trained image encoder is stronger and can be adapted to various downstream vision tasks.

In the following, some example embodiments of the present disclosure are further described with reference to the accompanying drawings.

Figure 3:
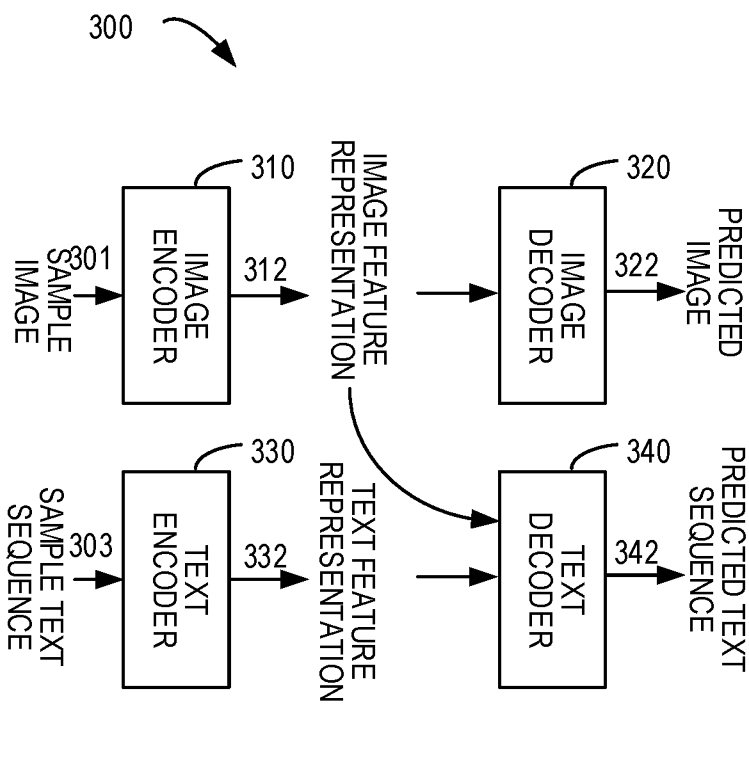
FIG. 3 illustrates a schematic diagram of a training architecture for image encoding learning in accordance with some embodiments of the present disclosure.

FIG. 3 illustrates a schematic diagram of a training architecture 300 for image encoding learning in accordance with some embodiments of the present disclosure. In some embodiments, the training architecture 300 may be implemented at the model pre-training system 110 of FIG. 1 for pre-training an image encoder. In some embodiments, in addition to the pre-training and fine-tuning training, an image encoder and an image decoder may be trained used as an overall model directly. In such embodiments, the training architecture 300 may be implemented at other model training systems. In the following, the pre-training architecture will be described as an example.

As shown in FIG. 3, the training architecture 300 involves an image encoder 310, an image decoder 320, a text encoder 330, and a text decoder 340. The training objective of the training architecture 300 is to enable the image encoder 310 to learn as much information as possible from the training data, so as to extract accurate features from the input image and apply them to different vision tasks. Herein, the encoder, also known as a feature extractor, is configured to extract feature representations of corresponding modal inputs. The decoder is configured to generate corresponding outputs from the feature representations provided by the encoder.

The training architecture 300 performs training with self-supervised learning. The training data includes sample images and sample image sequences. Each pair of sample images and sample image sequences can be associated with each other or matched. Here, association or matching refers to the capability of the sample text sequence to accurately describe the visual information presented by the sample image. In some embodiments, the sample image may include a static image (e.g., a single image) or a dynamic image (e.g., a video clip). Each video frame of the video clip can be considered a single image.

The training architecture 300 utilizes a generative training method. During the training process, a text generation task is at least performed for each pair of sample image 301 and sample text sequence 303. In some embodiments, an image generation task is also performed for each pair of sample image 301 and sample text sequence 303.

Specifically, an image feature representation 312 of the sample image 301 is extracted using the image encoder 310, and a text feature representation 332 of the sample text sequence 303 is extracted using the text encoder. The image feature representation 312 and the text feature representation 332 are provided to the text decoder 340. A feature representation may generally be in the form of a multidimensional vector. Herein, "feature representation" or simply "feature" is also referred to as an encoding representation, a vector representation, and the like. With the text decoder 340, a predicted text sequence 342 is generated based on the text feature representation 332 and the image feature representation 312. In this way, a text error between the generated predicted text sequence 342 and the sample text sequence 303 can be constructed, and the image encoder 310 can be trained at least based on the text error. For example, a loss function based on the text error can be constructed, and the image encoder 310 can be trained based on the loss value of the loss function.

The training of the image encoder 310 may include updating the parameter values of the image encoder 310 in such a direction that the text error (e.g., the corresponding loss function) is interactively decreased to an expected or minimum value. Since the image feature representation extracted by the image encoder 310 is used to guide the text generation of the text encoder 340, the loss in the text generation task can in turn guide the training of the image encoder 310. During the training process, multiple pairs of sample images and sample text sequences can be iteratively input to the image encoder 310 and the text encoder 330 to iteratively update the image encoder 310 until the text error between the predicted text sequence and the sample text sequence is decreased to the expected or minimum value. At least in the case where the text error is decreased to the expected or minimum value, the training of the image encoder 310 can be considered complete.

In some embodiments, in addition to the text generation task, the training of the image encoder 310 may be performed based on the image generation task. Specifically, the image decoder 320 is used to generate a predicted image 322 based on the image feature representation 312 extracted by the image encoder 310. The image encoder 310 is trained based on an image error between the predicted image 322 and the sample image 301. For example, a loss function based on the image error can be constructed, and the image encoder 310 can be trained based on the loss value of the loss function. In some embodiments, the total loss function for training the image encoder 310 can be constructed based on both the image error and the text error. In the case where the sum of the text error and the image error is decreased to an expected or minimum value, the training of the image encoder 310 can be considered complete.

In some embodiments, while training the image encoder 310, the text encoder 330, as well as the image decoder 320 and text decoder 340, may also be jointly trained based on the text error (and the image error). Thus, the parameter values of the text encoder 330, the image decoder 320, and the text decoder 340 are also updated together to achieve the purpose of decreasing the text error (and the image error) to an expected value or a minimum value.

Figure 4:
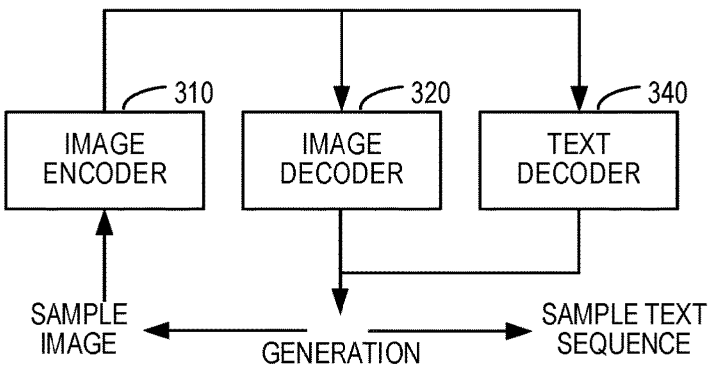
FIG. 4 illustrates a schematic diagram of a simplified training architecture for image encoding learning in accordance with some embodiments of the present disclosure.

FIG. 4 illustrates a schematic diagram of a simplified training architecture for image encoding learning in accordance with some embodiments of the present disclosure. As illustrated, the image feature representation extracted by the image encoder 310 is used for the text generation task performed by the text decoder 340 and for the image generation task performed by the image decoder 320. The training of the image encoder 310 is to learn useful feature information so that the text error between the predicted text sequence and the sample text sequence generated in the text generation task can be decreased or minimized, and the image error between the predicted image and the sample image generated in the image generation task can be decreased or minimized.

In some embodiments, the image encoder 310 and the image decoder 320 may be configured as machine learning models or neural networks that are suitable for processing visual data. The text encoder 330 and text decoder 340 may be configured as machine learning models or neural networks that are suitable for processing text data. In some embodiments, the image encoder 310, the image decoder 320, the text encoder 330, and/or the text decoder 340 may be implemented based on one or more transformer blocks or various variations of Transformer blocks, respectively. Some embodiments below will be illustrated using a model of Transformer blocks as an example. In addition to the Transformer blocks, one or more of the image encoder 310, the image decoder 320, the text encoder 330, and/or the text decoder 340 may be based on other types of models or neural networks, such as BERT architectures, convolution neural networks (CNNs), recurrent neural networks (RNNs), and the like. Specific types of model structures may be selected according to the actual requirements in applications.

In some embodiments, various image generation tasks can be constructed on the basis of the sample image 301. As an example, the sample image 301 may be corrupted before input to the image encoder 310. In this way, the image encoder 310 and the image decoder 320 need to learn to reconstruct the original, uncorrupted sample image 301 through the feature extraction and decoding processes. That is, the predicted image 322 is required to be as close as possible to the sample image 301. Such an image encoder can be called a denoising autoencoder (DAE). In some embodiments, the methods of destroying the sample image 301 may include masking, removing color channel(s), and so on.

Figure 5:
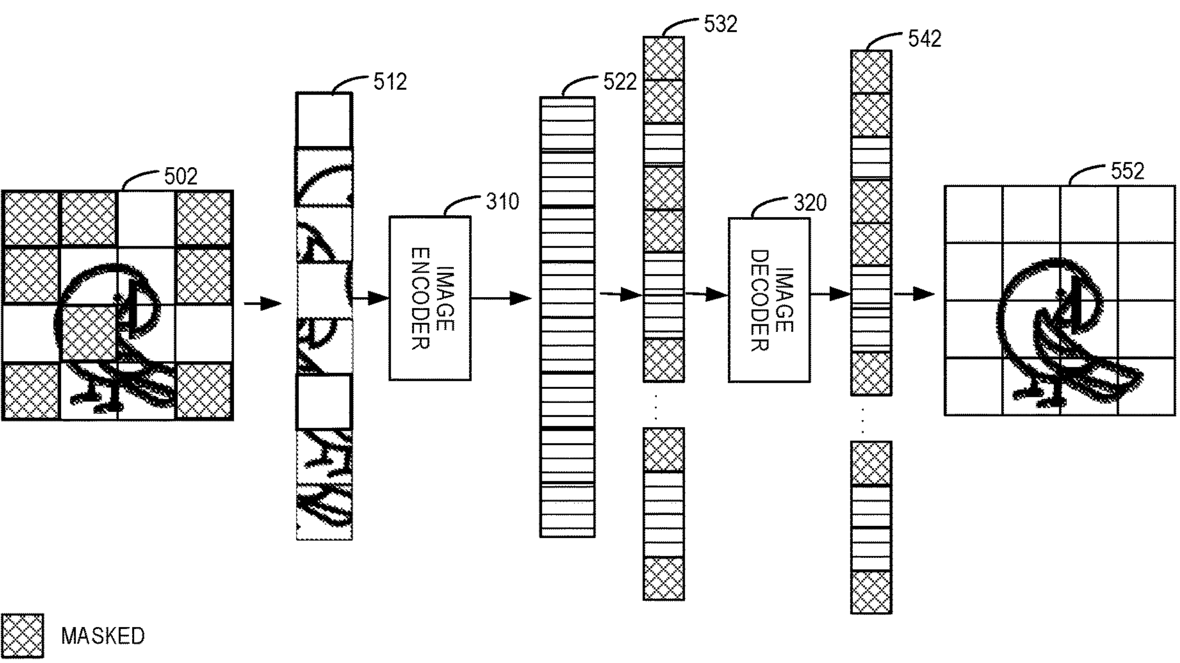
FIG. 5 illustrates a schematic diagram of an image encoding and decoding process during training in accordance with some embodiments of the present disclosure.

FIG. 5 illustrates a schematic diagram of the image encoding and decoding process in training in accordance with some embodiments of the present disclosure. in this example, it is assumed that image self-supervised learning is supported based on a masking scheme. For the purpose of discussion, an example sample image 502 is illustrated in FIG. 5, but this image does not imply any limitation to the embodiments of the present disclosure.

The sample image 502 can be divided into a plurality of image blocks, and at least one of the image blocks is to be masked. For example, the sample image 502 can be masked according to a certain mask probability (represented by $mask\_ratio \in [0,1]$). Assuming that the sample image 502 is divided into N image blocks, the number of remaining image blocks after masking is $M=(1-mask\_ratio)\times N$. It is assumed that each image block is mapped to a k-dimensional embedding vector representation. The M unmasked image blocks 512 (or k-dimensional embedding vector representations) are input to the image encoder 310 for feature extraction, and then feature representations 522 of the M image blocks are obtained. It is assumed that the dimension of the feature representation corresponding to each image block is d.

On the basis of the M d-dimensional feature representations, masked feature representations are filled in according to the positions of the unmasked image blocks in the sample image 502, to obtain the feature representations 532 for each of the N image blocks. In some embodiments, the filled mask feature representations are also learnable d-dimensional vectors and are shared between different masked image blocks (i.e., the same feature mask representation is populated for each mask image block).

The filled feature representations 532 of the N image blocks are provided to the image decoder 320 for decoding, to obtain the N k-dimensional embedding vector representations 542. A predicted image 552 can be mapped from the N k-dimensional embedding vector representations 542. The image error can be calculated based on the pixel-by-pixel difference (e.g., the minimum mean square error) between the predicted image 552 and the unmasked sample image 502. Various model training methods can be used based on the loss function corresponding to the image error, such as the gradient descent method, to update the parameter values of the image encoder 310 (as well as the image decoder 320, the text encoder 330, and the text decoder 340).

The above image decoder is also called a mask autoencoder (MAE). It would be appreciated that, in addition to the embodiments discussed with reference to FIG. 5, other image codec structures and other image generation tasks can be used to perform at least training tasks for the image encoder based on the sample image.

In the following, specific usage examples of image feature representations introduced in the text generation task will be introduced. As mentioned earlier, the sample text sequence 303 is associated with the sample image 301 and describes the visual information presented by the sample image 301. For example, for the example sample image in FIG. 5, the associated sample text sequence can be the English text sequence "a parrot combing feathers".

In the specific text encoding and decoding operations, a plurality of text units (e.g., single terms or words) in the sample text sequence 303 can be tokenized to be converted into embedded vector representations. For example, a lexicon can be defined to include V text units. In this way, each word in the lexicon can be converted into a V-dimensional one-hot vector (i.e., only one position in V dimensions is 1, and the rest are all 0). However, a language model (e.g., a fully connected (FC) network) can be learned to map V-dimensional one-hot vectors to smaller D-dimensional vectors (V>>D). In this way, each text unit can be uniquely mapped to a D-dimensional vector. By mapping each text unit in the sample text sequence, the sample text sequence 303 can be mapped to a feature sequence.

The feature sequence corresponding to the sample text sequence 303 is input to the text encoder 330 (represented as $f_{text}$) for feature extraction to obtain text feature representation 332 $[t_1, t_2, \ldots, t_L]$, where L is the number of text units in the sample text sequence 303.

In some embodiments, the task of text generation can be defined as predicting the $n^{-th}$ text unit using the feature information of the first n−1 text units in the input text sequence, that is, predicting the possible subsequent text units in view of the fact that only the preceding text units are seen. To achieve this prediction, for any given text unit in the L text units, the text encoder 330 can rely on the feature information of the given text unit and its preceding text unit(s) during the feature extraction, and not on the information of the text unit(s) following the given text unit.

Such attention constraints can be implemented by adding self-attention constraints to the text encoder 330. For example, for the text encoder 330 based on Transformer blocks, it relies on the attention mechanism to perform the feature extraction. In calculation of the self-attention matrix for each Transformer block, the feature extraction of each text unit can be constrained by processing the self-attention weight matrix into a lower triangular self-attention weight matrix to focus only on the text unit itself and its preceding text unit.

Figure 6:
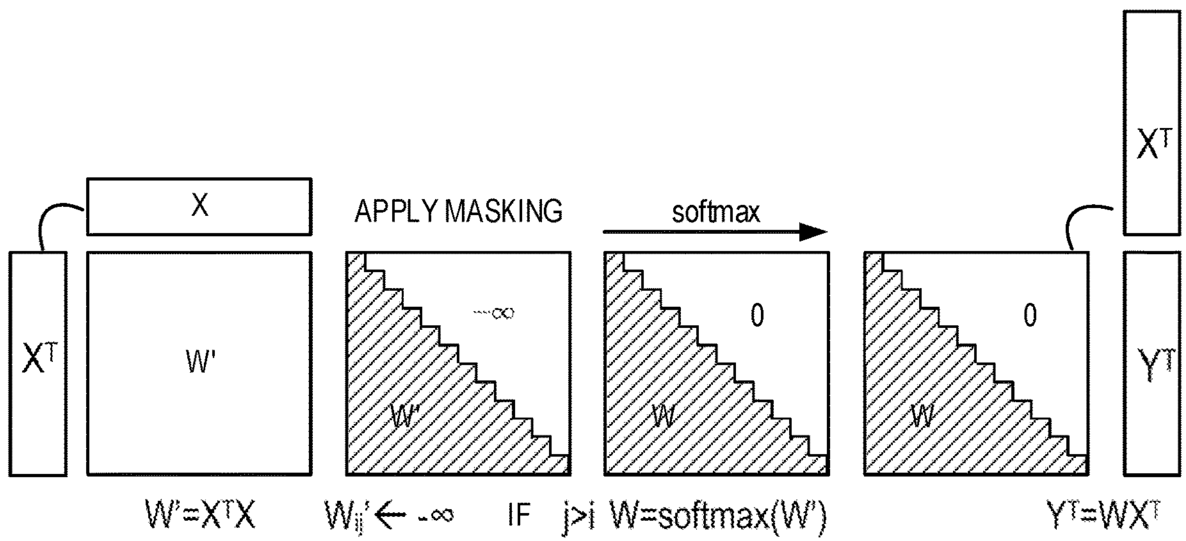
FIG. 6 illustrates a schematic diagram of attention matrix processing in the text encoding during training in accordance with some embodiments of the present disclosure.

FIG. 6 illustrates a schematic diagram of attention matrix processing in the text encoding during training in accordance with some embodiments of the present disclosure. In FIG. 6, it is assumed that X is the input of the self-attention block in the text encoder 330, and W' represents the self-attention weight matrix, which can be calculated by $W'=X^TX$. A mask is applied to the self-attention weight matrix W' to set the elements in the upper triangular region of the matrix W' to negative infinity (that is, for the $i^{-th}$ row and $j^{-th}$ column element $W'_{ij}$, if j>i, its value becomes negative infinity). The masked self-attention weight matrix W' is then processed with the softmax function to obtain the lower triangular self-attention matrix W, where the self-weights in the lower triangular region are retained, and the self-attention weights in the upper triangular region become 0. The lower triangular self-attention matrix W is applied to the input X to obtain the output Y of the current block, where $Y^T=WX^T$.

FIG. 6 illustrates the processing of a single self-attention block in the text encoder 330. The text encoder 330 may include a plurality of self-attention blocks, and may also include other types of blocks, which will not be described here.

Through the constraints on the self-attention weight matrix, the text encoder 330 can extract a feature representation 332 $[t_1, t_2, \ldots, t_L]$ with the feature representation $t_i$ corresponding to each text unit only characterizing feature information of this text unit and its preceding text unit(s).

The text decoder 340 is configured to predict, at each position, a next text unit in the sample text sequence based on the feature representation 332 provided by the text decoder 330 and the image feature representation 312 of the image encoder 310. In some embodiments, self-attention weights for the sample image 301 can be determined based on the image feature representation 312 and the text feature representation 332, and a predicted text sequence 342 can be generated based on the image feature representation and self-attention weights. For example, self-attention weights can include weights for feature representations corresponding to respective image blocks in the image feature representation. The self-attention weights can be applied to the feature representations of the respective image blocks. Such image feature representations can make the constraint text generation task more dependent on the output of the image encoder 310, which will indirectly increase the amount of information in the image feature representation.

In some embodiments, if the text decoder 340 includes one or more Transformer blocks, the text feature representation is defined as a query feature input to each Transformer block, and the image feature representation is defined as a key feature and a value feature input to each Transformer block. The processing of a Transformer block can be represented as follows:

$$\text{Attention}(Q, K, V) = \text{softmax}\left(\frac{QK^T}{\sqrt{d_k}}\right)V \tag{1}$$

where Q represents the query feature, K represents the key feature, V represents the value feature, and d k represents the number of columns of Q and K, i.e., the feature dimension. The above processing can be understood as calculating a self-attention weight matrix using the query feature Q and the key feature K, and applying the self-attention weight matrix to calculate a weighted sum with the value feature V. In general Transformer block processing, Q, K, and V are different projections of the same feature. In some embodiments of the present disclosure, after introducing the image feature representation, Q can be defined as the output of the text encoder 330, i.e., the text feature representation 332, and K, V can be defined as the output of the image encoder 310, i.e., the feature image representation 312.

The input of the text decoder 340 (represented as $g_{text}$) is the text feature representation 332 $[t_1, t_2, \ldots, t_L]$ output by the text encoder 330 and the image feature representation 312 $[i_1, i_2, \ldots, i_M]$ generated by the image encoder 310 (e.g., the image feature representation 522 extracted for the M masked image blocks in the example of FIG. 5).

The output of the text decoder 340 is a predicted text sequence 342, which can be represented as a feature sequence $[t'_1, t'_2, \ldots t'_L]$ with the same length as the sample text sequence 303, where $t'_i \in \mathbb{R}^D$. After post-processing, for example, by connecting a language model (which, for example, can be a fully connected (FC) network) after the text decoder 340, the D-dimensional feature representation can be remapped back to the V-dimensional one-hot vector $[t''_1, t''_2, \ldots, t''_L]$, where $t''_i \in \mathbb{R}^V$, and the mapped V-dimensional one-hot vector can be normalized to a sum of 1 (probabilities) after the processing of the softmax function. For example, after the processing of the softmax function on the V-dimensional one-hot vector $t'_1$ of the first text unit, a predicted probability distribution $[p_{11}, p_{12}, \ldots, p_{lL}]$ can be obtained, where $p_{11}+p_{12}+\ldots+p_{lL}=1$. For the predicted probability distribution of the $i^{-th}$ text unit $[p_{i1}, p_{i2}, \ldots, p_{iL}]$, the probability at each position indicates the prediction probability of the text unit at the corresponding position in the sample text sequence 301. The text unit corresponding to the position with the maximum probability is the predicted text unit.

As mentioned above, the text generation task is to predict the $n^{-th}$ text unit using the feature information of the first n−1 text units in the input text sequence. Based on this task objective, the label information can be constructed. For example, for text units $w_1, w_2, \ldots, w_{L-1}, w_L$ in the predicted text sequence, the prediction at each position is to predict a text unit at the next position. Thus, the label information corresponding to the entire sample text sequence is $w_2, w_3, \ldots, w_L, w_{EOS}$, where $w_{EOS}$ indicates the end of the sequence.

Thus, for the text decoding process, the text decoder 340, at any given text unit position, attempts to determine a predicted text unit using a text feature representation for the text unit and the image feature representation 312 provided by the image encoder, which predicted text unit is a prediction of a text unit after the current text unit in the sample text sequence. For example, the text decoder 340 generates a predicted text unit for text unit $w_2$ based on the text feature representation extracted for the first text unit $w_1$ and the image feature representation 312, and so on and so forth. For the last text unit in the sample text sequence, the text decoder 340 generates a prediction for text unit $w_2$ based on the text feature representation extracted for the last text unit and the image feature representation 312, that is, predicting whether the text unit is the end of the sample text sequence.

In the text error calculation, the cross entropy is calculated as the loss of the text generation task by comparing the predicted probability distribution $[p_{i1}, p_{i2}, \ldots, p_{iL}]$ of the $1^{-th}$ text unit output by the text decoder 340 with the V-dimensional one-hot vector for the corresponding labelled word at the word position (for example, the labelled word corresponding to the $i^{-th}$ text unit $w_i$ is $w_{i+1}$), where the V-dimensional one-hot vector has the value of 1 on the corresponding $(i+1)^{-th}$ bit, and has the value of 0 on the remaining bits. Various model training methods can be used on the basis of the loss function corresponding to the text error, such as the gradient descent method, to update the parameter values of the image encoder 310 (as well as the image decoder 320, the text encoder 330, and the text decoder 340).

In the training architecture of FIG. 3, the image feature representation extracted by the image encoder 310 is not only used to facilitate the image generation task, but also the text generation task, which impose more image feature learning constraints on the image encoder 310. In this way, the image encoder 310 is required to learn information that can better characterize the image features, so as to facilitate the text generation task and the image generation task at the same time.

In contrast, since the image feature representation provides additional feature information to facilitate the text decoder 320 to complete the text generation task, the text encoder 330 may not learn the same level of information as the image encoder 310. When considering the performance of downstream tasks, the trained image encoder 310 may be provided for the downstream tasks (e.g., various downstream vision tasks). The text encoder 330 may be discarded. In some embodiments, the text decoder 340 may be discarded. Depending on the actual task requirements, the image decoder 320 may be retained or discarded.

According to the embodiments of the present disclosure, generative tasks are used instead of discriminative pre-training/training tasks, to complete the training of image encoders. In some embodiments, the text generation task and image generation task are completed simultaneously. Compared with single-modal generation methods that rely only on image data, the training solution proposed in the embodiments of the present disclosure also utilizes multi-modal machine learning data (image data and text data). This training solution is more beneficial in learning sufficient information from multi-modal machine learning data. The trained image encoder can be better migrated to various downstream tasks.

In some embodiments, if the train architecture of FIG. 3 is a pre-training architecture, the trained image encoder 310 can be provided to a model fine-tuning system for fine-tuning as required by the downstream tasks. The image encoder 310 can be connected to an image decoder required by a downstream task. In some embodiments, during the fine-tuning stage, for example, if the downstream task is also an image generation task, a training architecture similar to that of FIG. 3 can be utilized to further fine-tune the image encoder 310. The fine-tuned image encoder 310 is provided together with the image decoder to implement the actual task.

In some embodiments, the image encoder 310 may also be applied directly to an actual downstream task. In the application of the downstream task (e.g., used by the model application system 130), the image encoder 310 will be used to extract an image feature representation of a target image.

The extracted image feature representation is used to perform a predetermined vision task for the target image. For example, if the vision task is image classification, a corresponding image decoder can be constructed to classify the target image into a certain category among a plurality of predetermined categories based on the extracted image feature representation. As another example, if the vision task is a semantic segmentation task, a corresponding image decoder can be constructed to determine a semantic segmentation map for the target image based on the extracted image feature representation, which indicates which semantic category each pixel in the target image is divided into among a plurality of semantic categories. In some examples, the predetermined vision task may also include an image generation task, such as extracting an image feature representation from an input image that has been corrupted by the image encoder 310 for reconstruct the original image based on the extracted image feature representation by the corresponding image decoder. Since the image encoder 310 learns a sufficient amount of information in training, it can accurately extract feature information of various images, and therefore can facilitate improvements of the downstream tasks.

Figure 7:
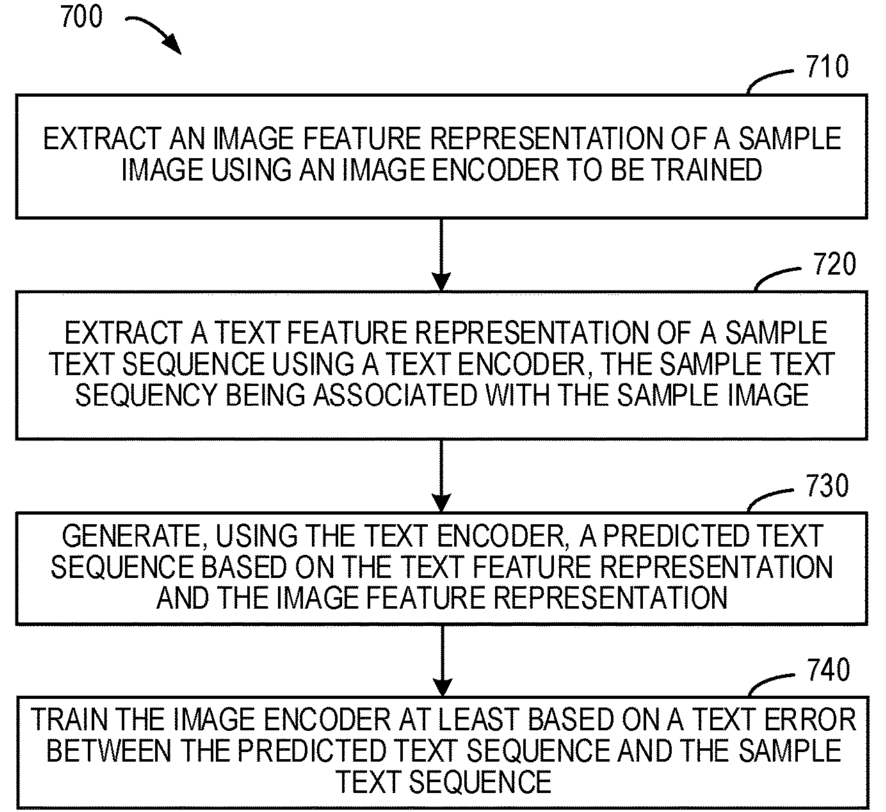
FIG. 7 illustrates a flowchart of a process for image encoding learning in accordance with some embodiments of the present disclosure.

FIG. 7 illustrates a flowchart of a process 700 for image encoding learning in accordance with some embodiments of the present disclosure. The process 700 may be implemented at the model pre-training system 110 and/or the model fine-tuning system 120. For the purpose of discussion, the process 700 will be described with reference to the environment 100 of FIG. 1.

At block 710, the model pre-training system 110 and/or the model fine-tuning system 120 extracts an image feature representation of a sample image using an image encoder to be trained. At block 720, the model pre-training system 110 and/or the model fine-tuning system 120 extracts a text feature representation of a sample text sequence using a text encoder, the sample text sequency being associated with the sample image.

At block 730, the model pre-training system 110 and/or the model fine-tuning system 120 generates, using the text encoder, a predicted text sequence based on the text feature representation and the image feature representation. At block 740, the model pre-training system 110 and/or the model fine-tuning system 120 trains the image encoder at least based on a text error between the predicted text sequence and the sample text sequence.

In some embodiments, training the image encoder includes: generating, using the image encoder, a predicted image based on the image feature representation; and training the image encoder further based on an image error between the predicted image sequence and the sample image sequence.

In some embodiments, training the image encoder includes: jointly training the image encoder and the text encoder at least based on the text error. In some embodiments, the process 700 further includes: providing the trained image encoder for a downstream task, wherein the text encoder is discarded.

In some embodiments, extracting the image feature representation includes: masking at least one image block of the sample image; and extracting, using the image encoder, the image feature representation from at least one unmasked image block of the sample image.

In some embodiments, the sample text sequence includes a plurality of text units, and extracting the text feature representation includes: for a given text unit of the plurality of text units, extracting a text feature representation for the given text unit from the given text unit and at least one text unit preceding the given text unit in the sample text sequence.

In some embodiments, generating the predicted text sequence includes: for a given text unit of the plurality of text units, determining a predicted text unit from the text feature representation for the given text unit and the image feature representation, the predicted text unit a prediction of a text unit following the given text unit in the sample text sequence.

In some embodiments, the given text unit is a last text unit in the sample text sequence, and the predicted text unit is a prediction of an end of the sample text sequence.

In some embodiments, the sample text sequence includes a plurality of text units, and generating the predicted text sequence includes: determining self-attention weights for the sample image based on the image feature representation and the text feature representation; and generating the predicted text sequence based on the image feature representation and the self-attention weights.

In some embodiments, the text encoder includes a transformer block, and the text feature representation is defined as a query feature input to the transformer block, and the image feature representation is defined as a key feature and a value feature input to the transformer block.

Figure 8:
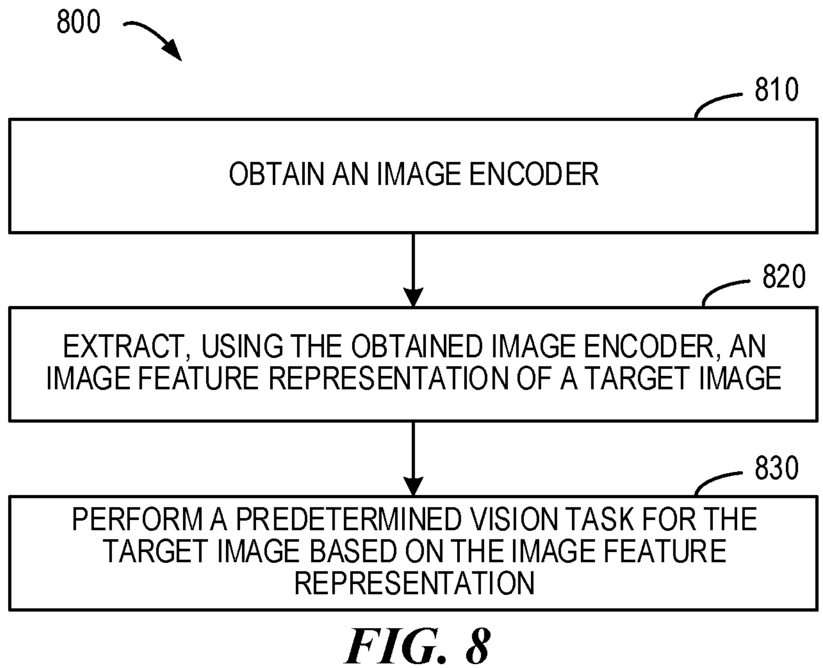
FIG. 8 illustrates a flowchart of a process for image encoding application in accordance with some embodiments of the present disclosure.

FIG. 8 illustrates a flowchart of a process 800 for image encoding application in accordance with some embodiments of the present disclosure. The process 800 may be implemented at the model application system 130. For the purpose of discussion, the process 800 will be described with reference to the environment 100 of FIG. 1.

At block 810, the model application system 130 obtains an image encoder trained according to any embodiment in the process 700. At block 820, the model application system 130 extracts an image feature representation of a target image using the obtained image encoder. At block 830, the model application system 130 performs a predetermined vision task for the target image based on the image feature representation.

Figure 9:
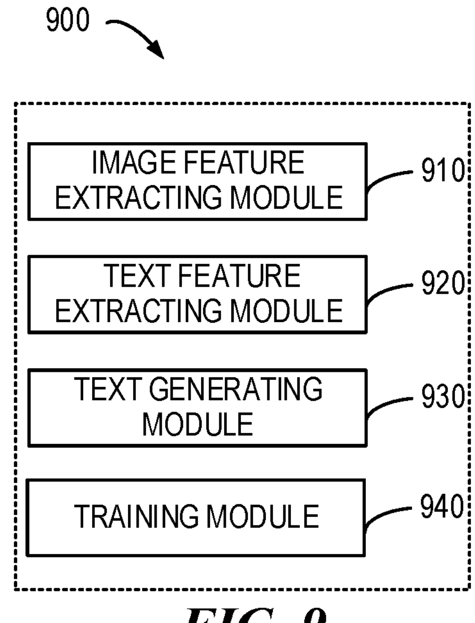
FIG. 9 illustrates a block diagram of an apparatus for image encoding learning in accordance with some embodiments of the present disclosure.

FIG. 9 illustrates a block diagram of an apparatus 900 for image encoding learning in accordance with some embodiments of the present disclosure. Apparatus 900 may be implemented, for example, or included in model pre-training system 110 and/or model fine-tuning system 120. The various modules/components in apparatus 900 may be implemented by hardware, software, firmware, or any combination thereof.

As shown, the apparatus 900 includes an image feature extracting module 910 configured to extract an image feature representation of a sample image using an image encoder to be trained. The apparatus 900 also includes a text feature extracting module 920 configured to extract a text feature representation of a sample text sequence using a text encoder, the sample text sequency being associated with the sample image. The apparatus 900 also includes a text generating module 930 configured to generate, using the text encoder, a predicted text sequence based on the text feature representation and the image feature representation. The apparatus 900 also includes a training module 940 configured to train the image encoder at least based on a text error between the predicted text sequence and the sample text sequence.

In some embodiments, the training module 940 includes: an image generating module configured to generate, using the image encoder, a predicted image based on the image feature representation; and an image error-based training module configured to train the image encoder further based on an image error between the predicted image sequence and the sample image sequence.

In some embodiments, the training module 940 includes a joint training module configured to jointly train the image encoder and the text encoder at least based on the text error. In some embodiments, the apparatus 900 further includes an encoder providing module configured to provide the trained image encoder for a downstream task, wherein the text encoder is discarded.

In some embodiments, the image feature extracting module 910 includes: an image masking module configured to mask at least one image block of the sample image; and a post-masking extracting module configured to extract, using the image encoder, the image feature representation from at least one unmasked image block of the sample image.

In some embodiments, the sample text sequence includes a plurality of text units, and wherein the text feature extracting module 920 is configured to: for a given text unit of the plurality of text units, extract a text feature representation for the given text unit from the given text unit and at least one text unit preceding the given text unit in the sample text sequence.

In some embodiments, the text generating module 930 is configured to: for a given text unit of the plurality of text units, determine a predicted text unit from the text feature representation for the given text unit and the image feature representation, the predicted text unit a prediction of a text unit following the given text unit in the sample text sequence.

In some embodiments, if the given text unit is a last text unit in the sample text sequence, the predicted text unit is a prediction of an end of the sample text sequence.

In some embodiments, the sample text sequence includes a plurality of text units, and the text generating module 930 includes: a weight determining module configured to determine self-attention weights for the sample image based on the image feature representation and the text feature representation; and a weight-based text generating module configured to generate the predicted text sequence based on the image feature representation and the self-attention weights.

In some embodiments, the text encoder includes a transformer block, and the text feature representation is defined as a query feature input to the transformer block, and the image feature representation is defined as a key feature and a value feature input to the transformer block.

Figure 10:
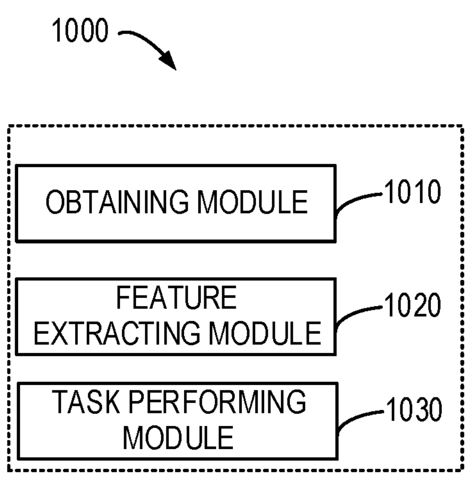
FIG. 10 illustrates a block diagram of an apparatus for image encoding application in accordance with some embodiments of the present disclosure.

FIG. 10 illustrates a block diagram of an apparatus 1000 for image encoding application in accordance with some embodiments of the present disclosure. The apparatus 1000 may be implemented, for example, or included in the model application system 130. The various modules/components in the apparatus 1000 may be implemented by hardware, software, firmware, or any combination thereof.

As shown, the apparatus 1000 includes an obtaining module 1010 configured to obtain an image encoder that is trained according to any of the embodiments of the apparatus 900. The apparatus 1000 also includes a feature extracting module 1020 configured to extract, using the obtained image encoder, an image feature representation of a target image. The apparatus 1000 also includes a task performing module 1030 configured to perform a predetermined vision task for the target image based on the image feature representation.

Figure 11:
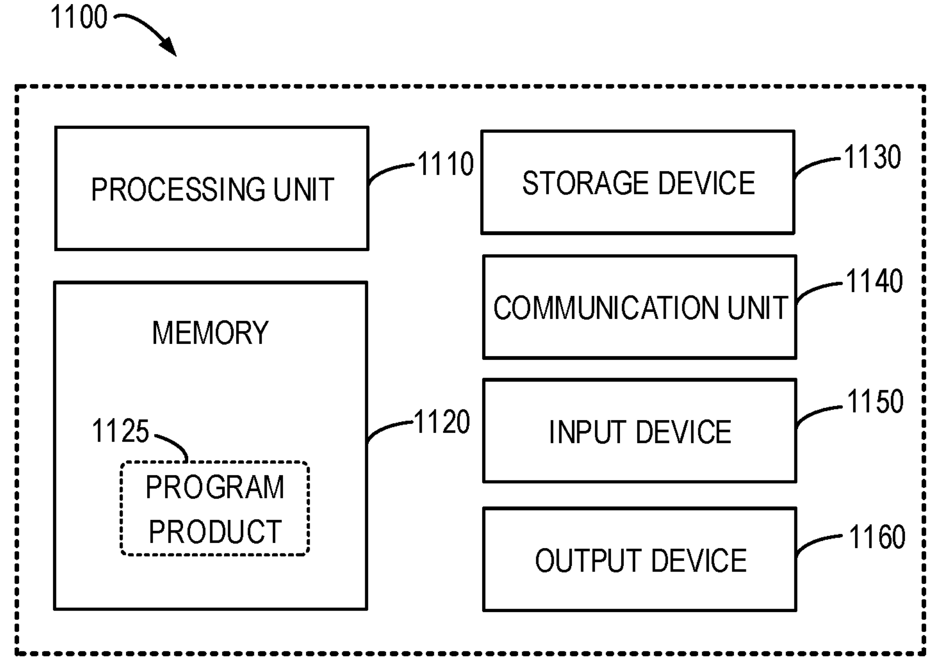
FIG. 11 illustrates a block diagram of an electronic device in which one or more embodiments of the present disclosure can be implemented.

FIG. 11 illustrates a block diagram of an electronic device 1100 may be one or more embodiments of the present disclosure. It would be appreciated that the electronic device 1100 shown in FIG. 11 is merely exemplary and should not constitute any limitation on the functionality and scope of the embodiments described herein. The electronic device 1100 may be used, for example, to implement the model pre-training system 110, the model fine-tuning system 120, and/or the model application system 130 of FIG. 1, and/or the apparatus 900 of FIG. 9, and/or the apparatus 1000 of FIG. 10.

As shown in FIG. 11, the electronic device 1100 is in the form of a general computing device. The components of the electronic device 1100 may include, but are not limited to, one or more processors or processing units 1110, a memory 1120, a storage device 1130, one or more communication units 1140, one or more input devices 1150, and one or more output devices 1160. The processing unit 1110 may be an actual or virtual processor and can execute various processes according to the programs stored in the memory 1120. In a multiprocessor system, multiple processing units execute computer executable instructions in parallel to improve the parallel processing capability of the electronic device 1100.

The electronic device 1100 typically includes a variety of computer storage medium. Such medium may be any available medium that is accessible to the electronic device 1100, including but not limited to volatile and non-volatile medium, removable and non-removable medium. The memory 1120 may be volatile memory (for example, a register, cache, a random access memory (RAM)), a non-volatile memory (for example, a read-only memory (ROM), an electrically erasable programmable read-only memory (EEPROM), a flash memory) or any combination thereof. The storage device 1130 may be any removable or non-removable medium, and may include a machine-readable medium, such as a flash drive, a disk, or any other medium, which can be used to store information and/or data (such as training data for training) and can be accessed within the electronic device 1100.

The electronic device 1100 may further include additional removable/non-removable, transitory/non-transitory, volatile/non-volatile storage medium. Although not shown in FIG. 11, a disk driver for reading from or writing to a removable, non-volatile disk (such as a "floppy disk"), and an optical disk driver for reading from or writing to a removable, non-volatile optical disk can be provided. In these cases, each driver may be connected to the bus (not shown) by one or more data medium interfaces. The memory 1120 may include a computer program product 1125, which has one or more program modules configured to perform various methods or acts of various embodiments of the present disclosure.

The communication unit 1140 communicates with a further computing device through the communication medium. In addition, functions of components in the electronic device 1100 may be implemented by a single computing cluster or multiple computing machines, which can communicate through a communication connection. Therefore, the electronic device 1100 may be operated in a networking environment using a logical connection with one or more other servers, a network personal computer (PC), or another network node.

The input device 1150 may be one or more input devices, such as a mouse, a keyboard, a trackball, etc. The output device 1160 may be one or more output devices, such as a display, a speaker, a printer, etc. The electronic device 1100 may also communicate with one or more external devices (not shown) through the communication unit 1140 as required. The external device, such as a storage device, a display device, etc., communicate with one or more devices that enable users to interact with the electronic device 1100, or communicate with any device (for example, a network card, a modem, etc.) that makes the electronic device 1100 communicate with one or more other computing devices. Such communication may be executed via an input/output (I/O) interface (not shown).

According to example implementation of the present disclosure, a non-transitory computer-readable storage medium is provided, on which a computer-executable instruction or computer program is stored, where the computer-executable instructions or the computer program is executed by the processor to implement the method described above. According to example implementation of the present disclosure, a computer program product is also provided. The computer program product is physically stored on a non-transient computer-readable medium and includes computer-executable instructions, which are executed by the processor to implement the method described above.

Various aspects of the present disclosure are described herein with reference to the flow chart and/or the block diagram of the method, the device, the equipment and the computer program product implemented in accordance with the present disclosure. It would be appreciated that each block of the flowchart and/or the block diagram and the combination of each block in the flowchart and/or the block diagram may be implemented by computer-readable program instructions.

These computer-readable program instructions may be provided to the processing units of general-purpose computers, special computers or other programmable data processing devices to produce a machine that generates a device to implement the functions/acts specified in one or more blocks in the flow chart and/or the block diagram when these instructions are executed through the processing units of the computer or other programmable data processing devices. These computer-readable program instructions may also be stored in a computer-readable storage medium. These instructions enable a computer, a programmable data processing device and/or other devices to work in a specific way. Therefore, the computer-readable medium containing the instructions includes a product, which includes instructions to implement various aspects of the functions/acts specified in one or more blocks in the flowchart and/or the block diagram.

The computer-readable program instructions may be loaded onto a computer, other programmable data processing apparatus, or other devices, so that a series of operational steps can be performed on a computer, other programmable data processing apparatus, or other devices, to generate a computer-implemented process, such that the instructions which execute on a computer, other programmable data processing apparatus, or other devices implement the functions/acts specified in one or more blocks in the flowchart and/or the block diagram.

The flowchart and the block diagram in the drawings show the possible architecture, functions and operations of the system, the method and the computer program product implemented in accordance with the present disclosure. In this regard, each block in the flowchart or the block diagram may represent a part of a module, a program segment or instructions, which contains one or more executable instructions for implementing the specified logic function. In some alternative implementations, the functions marked in the block may also occur in a different order from those marked in the drawings. For example, two consecutive blocks may actually be executed in parallel, and sometimes can also be executed in a reverse order, depending on the function involved. It should also be noted that each block in the block diagram and/or the flowchart, and combinations of blocks in the block diagram and/or the flowchart, may be implemented by a dedicated hardware-based system that performs the specified functions or acts, or by the combination of dedicated hardware and computer instructions.

Each implementation of the present disclosure has been described above. The above description is example, not exhaustive, and is not limited to the disclosed implementations. Without departing from the scope and spirit of the described implementations, many modifications and changes are obvious to ordinary skill in the art. The selection of terms used in this article aims to best explain the principles, practical application or improvement of technology in the market of each implementation, or to enable other ordinary skill in the art to understand the various embodiments disclosed herein.

What is claimed is:

1. A method for data encoding learning, comprising:

extracting an image feature representation of a sample image using an image encoder to be trained;

extracting a text feature representation of a sample text sequence using a text encoder, the sample text sequency being associated with the sample image;

generating, using the text encoder, a predicted text sequence based on the text feature representation and the image feature representation; and training the image encoder at least based on a text error between the predicted text sequence and the sample text sequence;

wherein training the image encoder comprises:

jointly training the image encoder and the text encoder at least based on the text error.

2. The method of claim 1, wherein training the image encoder comprises:

generating, using the image encoder, a predicted image based on the image feature representation; and training the image encoder further based on an image error between the predicted image sequence and the sample image sequence.

3. The method of claim 1, wherein the method further comprises:

providing the trained image encoder for a downstream task, wherein the text encoder is discarded.

4. The method of claim 1, wherein extracting the image feature representation comprises:

masking at least one image block of the sample image; and extracting, using the image encoder, the image feature representation from at least one unmasked image block of the sample image.

5. The method of claim 1, wherein the sample text sequence comprises a plurality of text units, and wherein extracting the text feature representation comprises: for a given text unit of the plurality of text units, extracting a text feature representation for the given text unit from the given text unit and at least one text unit preceding the given text unit in the sample text sequence.

6. The method of claim 5, wherein generating the predicted text sequence comprises: for a given text unit of the plurality of text units, determining a predicted text unit from the text feature representation for the given text unit and the image feature representation, the predicted text unit a prediction of a text unit following the given text unit in the sample text sequence.

7. The method of claim 5, wherein the given text unit is a last text unit in the sample text sequence, and the predicted text unit is a prediction of an end of the sample text sequence.

8. The method of claim 1, wherein the sample text sequence comprises a plurality of text units, and wherein generating the predicted text sequence comprises:

determining self-attention weights for the sample image based on the image feature representation and the text feature representation; and generating the predicted text sequence based on the image feature representation and the self-attention weights.

9. The method of claim 1, wherein the text encoder comprises a transformer block, and the text feature representation is defined as a query feature input to the transformer block, and the image feature representation is defined as a key feature and a value feature input to the transformer block.

10. The method of claim 1, further comprising:

extracting, using the trained image encoder, an image feature representation of a target image; and performing a predetermined vision task for the target image based on the image feature representation of the target image.

11. An electronic device, comprising:

at least one processing unit; and at least one memory coupled to the at least one processing unit and storing instructions executable by the at least one processing unit, the instructions, upon execution by the at least one processing unit, causing the device to perform acts comprising:

extracting an image feature representation of a sample image using an image encoder to be trained;

extracting a text feature representation of a sample text sequence using a text encoder, the sample text sequency being associated with the sample image;

generating, using the text encoder, a predicted text sequence based on the text feature representation and the image feature representation; and training the image encoder at least based on a text error between the predicted text sequence and the sample text sequence;

wherein training the image encoder comprises:

jointly training the image encoder and the text encoder at least based on the text error.

12. The electronic device of claim 11, wherein training the image encoder comprises:

generating, using the image encoder, a predicted image based on the image feature representation; and training the image encoder further based on an image error between the predicted image sequence and the sample image sequence.

13. The electronic device of claim 11, wherein the acts further comprises:

providing the trained image encoder for a downstream task, wherein the text encoder is discarded.

14. The electronic device of claim 11, wherein extracting the image feature representation comprises:

masking at least one image block of the sample image; and extracting, using the image encoder, the image feature representation from at least one unmasked image block of the sample image.

15. The electronic device of claim 11, wherein the sample text sequence comprises a plurality of text units, and wherein extracting the text feature representation comprises: for a given text unit of the plurality of text units, extracting a text feature representation for the given text unit from the given text unit and at least one text unit preceding the given text unit in the sample text sequence.

16. The electronic device of claim 15, wherein generating the predicted text sequence comprises: for a given text unit of the plurality of text units, determining a predicted text unit from the text feature representation for the given text unit and the image feature representation, the predicted text unit a prediction of a text unit following the given text unit in the sample text sequence.

17. The electronic device of claim 15, wherein the given text unit is a last text unit in the sample text sequence, and the predicted text unit is a prediction of an end of the sample text sequence.

18. The electronic device of claim 11, wherein the sample text sequence comprises a plurality of text units, and wherein generating the predicted text sequence comprises:

determining self-attention weights for the sample image based on the image feature representation and the text feature representation; and generating the predicted text sequence based on the image feature representation and the self-attention weights.

19. The electronic device of claim 11, wherein the text encoder comprises a transformer block, and the text feature representation is defined as a query feature input to the transformer block, and the image feature representation is defined as a key feature and a value feature input to the transformer block.

20. A non-transitory computer-readable storage medium, having a computer program stored thereon which, upon execution by a processor, implements acts comprising:

extracting an image feature representation of a sample image using an image encoder to be trained;

extracting a text feature representation of a sample text sequence using a text encoder, the sample text sequency being associated with the sample image;

generating, using the text encoder, a predicted text sequence based on the text feature representation and the image feature representation; and training the image encoder at least based on a text error between the predicted text sequence and the sample text sequence;

wherein training the image encoder comprises:

jointly training the image encoder and the text encoder at least based on the text error.

* * * * *